US009119103B2

(12) United States Patent
Beattie, Jr. et al.

(10) Patent No.: US 9,119,103 B2
(45) Date of Patent: Aug. 25, 2015

(54) MANAGING MEDIA DISTRIBUTION BASED ON A SERVICE QUALITY INDEX VALUE

(71) Applicant: AT&T Intellectual Property I, L.P., Atlanta, GA (US)

(72) Inventors: James Gordon Beattie, Jr., Bergenfield, NJ (US); Arvind R. Mallya, Walnut Creek, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 229 days.

(21) Appl. No.: 13/705,956

(22) Filed: Dec. 5, 2012

(65) Prior Publication Data

US 2014/0153419 A1   Jun. 5, 2014

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 24/10* | (2009.01) |
| *H04L 12/825* | (2013.01) |
| *H04L 12/911* | (2013.01) |
| *H04L 12/851* | (2013.01) |
| *H04L 12/725* | (2013.01) |
| *H04L 29/06* | (2006.01) |
| *H04L 12/853* | (2013.01) |
| *H04W 24/08* | (2009.01) |

(52) U.S. Cl.
CPC ......... *H04W 24/10* (2013.01); *H04L 29/06523* (2013.01); *H04L 45/302* (2013.01); *H04L 47/24* (2013.01); *H04L 47/2416* (2013.01); *H04L 47/25* (2013.01); *H04L 47/78* (2013.01); *H04L 47/781* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2002/0141392 A1* | 10/2002 | Tezuka et al. | 370/352 |
| 2007/0008894 A1* | 1/2007 | Lynch et al. | 370/244 |
| 2008/0192119 A1 | 8/2008 | Li et al. | |
| 2008/0198754 A1 | 8/2008 | Savoor et al. | |
| 2008/0219268 A1* | 9/2008 | Dennison | 370/395.2 |
| 2009/0064248 A1 | 3/2009 | Kwan et al. | |
| 2010/0043044 A1 | 2/2010 | Li et al. | |
| 2011/0317020 A1 | 12/2011 | Medina et al. | |

OTHER PUBLICATIONS

Yow-Jian Lin, and Mun Choon Chan, A Scalable Monitoring Approach Based on Aggregation and Refinement, IEEE Journal on selected Areas in Communications, vol. 20, No. 4, May 2002, pp. 677-690.*

Clarke, B. Claise, Request for Comments 6390: Guidelines for Considering New Performance Metric Development, pp. 1-23, Oct. 2011.*

D. Maham, Building a Resilience Infrastructure for Content Distribution, Andicom 2009, Oct. 29, 2009, pp. 1-21.*

* cited by examiner

*Primary Examiner* — Christopher Crutchfield

(74) *Attorney, Agent, or Firm* — Toler Law Group, PC

(57) ABSTRACT

A method includes receiving first measurement data from a first device. The first device may be a first element of a communication path. The first measurement data may correspond to a first measured parameter associated with performance of the communication path. The method further includes receiving second measurement data from a second device. The second device may be a second element of the communication path. The second measurement data may correspond to a second measured parameter (distinct from the first measured parameter) associated with performance of the communication path. The method further includes determining a first service quality index value corresponding to performance of the communication path based on the first measurement data and the second measurement data.

20 Claims, 5 Drawing Sheets

MANAGING MEDIA DISTRIBUTION BASED ON A SERVICE QUALITY INDEX VALUE

FIELD OF THE DISCLOSURE

The present disclosure is generally related to managing media distribution.

BACKGROUND

Service quality can be a differentiating factor between service providers that utilize distributed networks, such as media distribution networks, mobile data or mobile telephony networks, etc. A media distributor that is concerned with service quality associated with distribution of media content may monitor performance of network elements used to distribute the media content. The media distributor may analyze performance metrics of individual network elements in isolation to identify potential service quality issues and to evaluate the severity of the service quality issues.

DETAILED DESCRIPTION

Figure 1:
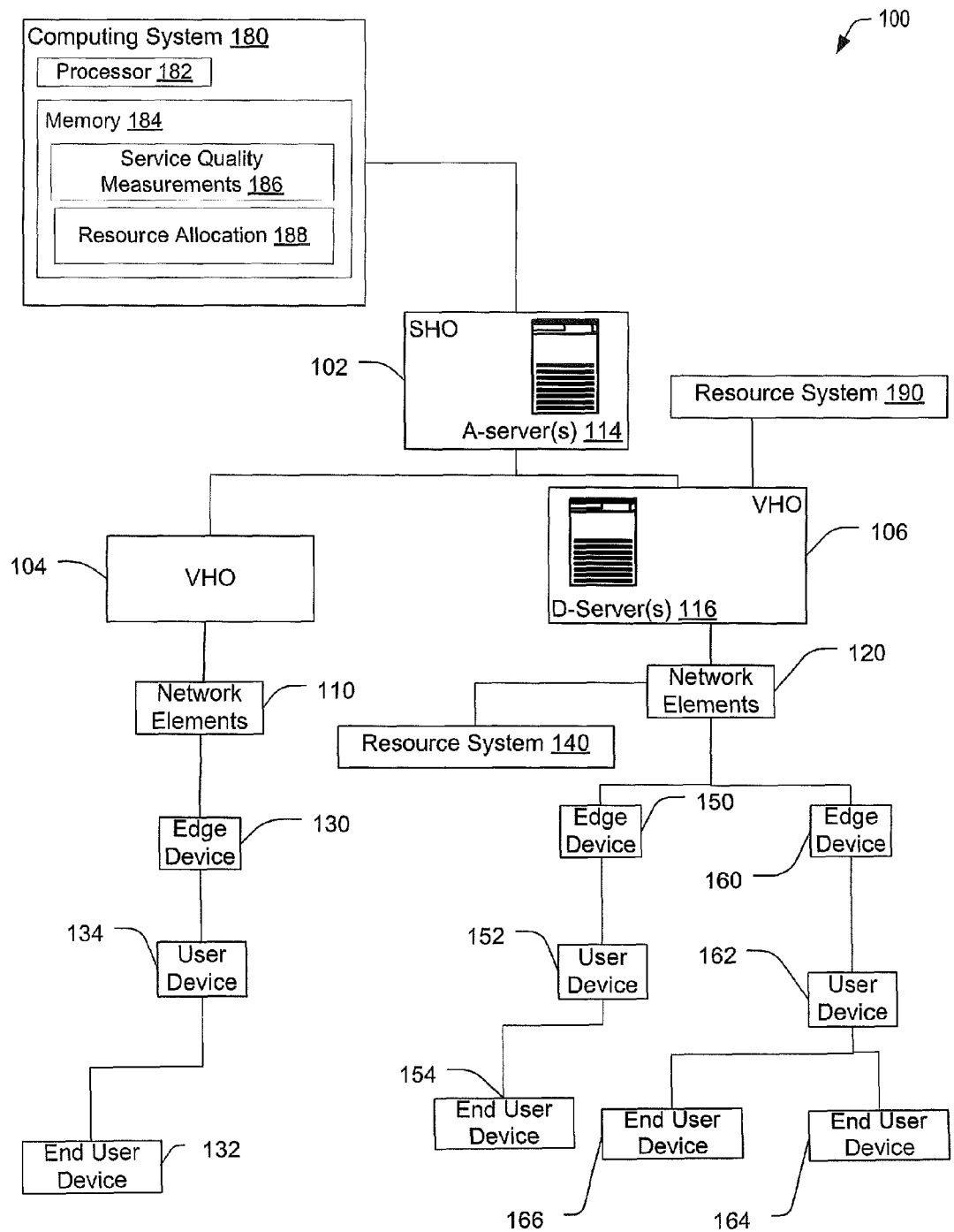
FIG. 1 is a diagram illustrating a first embodiment of a system for managing media distribution based on a service quality index value.

A level of service quality for distribution of media content (e.g., video content, audio content, multimedia content, voice-over-interne protocol data, communication data, image data, etc.) in a media distribution system (MDS) may be managed based on a service quality index (SQI) value. The SQI value may provide an indication of a level of service quality for end-to end distribution of the media content. The SQI value may be determined for a communication path from a media source to an end user device (e.g., a media playback device or a customer premise equipment) within a network (e.g., a hierarchical distribution network) of the MDS based on data associated with the plurality of network elements (e.g., routers, switches, servers, gateways, etc.) in the communication path. The data associated with the plurality of network elements in the communication path may include various indicators of service quality for the distribution of the media content based on a plurality of measured parameters. The plurality of measured parameters may correspond to different types of parameters, may be measured at different network elements, and may be associated with different layers of a communication protocol stack, such as different layers corresponding to an open systems interconnection (OSI) standard model. The SQI value may provide a useful measure of a level of service quality for a communication path because the SQI value is based on an aggregation of measured parameters from more than one element in the communication path. As such, monitoring service quality of a communication path in the MDS may be performed more efficiently using the SQI value rather than using individual measured parameters from different network elements in the communication path.

The MDS may include or be coupled to a computing device ("distribution management device") that is configured to determine the SQI value for multiple communication paths of the hierarchical network. The SQI value may be defined within a range of values (e.g., a range of numeric values from 0 to 100 or a range of alphanumeric values from A to Z) indicating a level of service quality. For example, the SQI may be defined such that a larger SQI value corresponds to a greater level of service quality for a communication path, and a smaller SQI value corresponds to a lesser level of service quality for the communication path. The SQI value may be useful for determining whether quality of service associated with the communication path is satisfactory (e.g., satisfies a threshold level that defines particular level of service quality) for a particular end user. Alternatively, or in addition, each communication path may be compared to another communication path based on a respective SQI value to determine whether service quality of each communication path is satisfactory. For example, when a difference between a first SQI value of a first communication path (e.g., a reference communication path having service quality that is satisfactory) and a second SQI value of a second communication path (e.g., a communication path being tested) exceeds a particular amount, the quality of service for the second communication path may not be satisfactory for a particular end user. The SQI value may provide a uniform measure of service quality that enables a plurality of communication paths to be compared based on the SQI value to determine whether service quality to an end user of a particular communication path is satisfactory.

Further, communication paths that share one or more network elements may have a correlated level of service quality such that SQI values for the communications path may be similar (e.g., differ by less than a particular amount) because the SQI values are based in part on measured parameters received from the shared network elements. Based on the SQI values of the communication paths, issues affecting service quality for a group of end users provided with service via communication paths that have shared network elements may be identified. For example, a threshold for service quality based on an SQI value may be defined for a group of communication paths that share one or more network elements so that service quality for the group of communication paths can be monitored for issues affecting the shared network elements. Measured parameters of a shared network element having service quality issues may affect the SQI values determined for the communication paths in the group such that the SQI values no longer satisfy the threshold for service quality defined for the group.

To illustrate, the distribution management device may determine an SQI value for a communication path based on more than one measured parameter (e.g., performance parameters) gathered from one or more of the plurality of network elements associated with the communication path. The distribution management device may receive a first measured parameter from a first device (e.g., an end user device, such as a set top box) in a communication path. For example, the first measured parameter may correspond to a parameter (e.g., packet loss) measured by performing a first test (e.g., an audio and video diagnostic test) associated with a first layer (e.g., a network layer of an OSI standard model) of a communication protocol stack of the first device. The distribution management device may receive a second measured parameter from a second device (e.g., a router or a switch) in the communication path. For example, the second measured parameter may correspond to a parameter (e.g., loss of signal) measured by performing a second test (e.g., digital subscriber line test) associated with a second layer (e.g., a physical layer of the OSI standard model) of a communication protocol stack of the second device. The distribution management device may receive a third measured parameter from a third device (e.g., a server of a super headend office or a server of a video headend office) in the communication path. For example, the third measured parameter may correspond to a parameter (e.g., picture quality, such as a black screen or a frozen screen) measured by performing a third test (e.g., a test performed by a remote program monitoring application) associated with a third layer (e.g., a transport layer of the OSI standard model) of a communication protocol stack of the third device. The first measured parameter, the second measured parameter, and the third measured parameter are distinct from each other.

The SQI value for the communication path may be determined based on an aggregation of the measured parameters (e.g., the first measured parameter, the second measured parameter, and the third measured parameter). Aggregation of the measured parameters may be performed using scaled values for each of the measured parameters, which may correspond to a different measurement format. The scaled value for a particular measured parameter may correspond to a measured value for the particular measured parameter scaled to a value within a scaling range associated with the SQI.

In a particular embodiment, a different scale may be used to determine a scaled value for each different type of measured parameter. The scale may be weighted or selected (e.g., predefined) to account for strength of the measured parameter as an indicator of service quality. In the example illustrated above, a different scale may be used to determine a scaled value for each of the measured parameters (e.g., the first measured parameter, the second measured parameter, and the third measured parameter). Scaled values associated with the first measured parameter, the second measure parameter, and the third measured parameter may be summed (or otherwise numerically aggregated) to determine an SQI value that accounts for the first measured parameter, the second measured parameter, and the third measured parameter.

In a particular embodiment, a weight value may be applied to each scaled value to account for strength of each measured parameter as an indicator of service quality. For example, each measured parameter (or a set of measured parameters) may be scaled to a value between 1 and 10. In this example, a weighted sum of the scaled values may be used to determine the SQI value, where each scaled value is weighted based on how closely related to service quality a measured parameter associated with the scaled value is. To illustrate, a smaller weight value may be applied to a first scaled value of a first measured parameter that is a weak indicator of service quality for a communication path, and a larger weight value may be applied to a second scaled value of a second measured parameter that is a stronger indicator of the service quality of the communication path.

The distribution management device may perform an action based on the SQI value of the one or more communication paths. For example, the action may include performing an adjustment to the one or more communication paths. An adjustment to the communication path may cause a change in the level of service quality of the communication path, which may be reflected by a change in the SQI value of the communication path. The action may include allocating one or more resources to the communication path. For example, the distribution management device may communicate with one or more other computing devices (e.g., devices associated with a service center of the MDS), one or more resource systems, or both, to allocate resources to cause the level of service quality for the communication path to change. In another example, the distribution management device may cause one or more testing resources (e.g., a test system of the MDS) to be allocated to perform automated tests to determine additional information about one or more network elements in the communication path. In another example, one or more devices (e.g., a server, a storage device, a network element, an edge device, a user device) may be associated with or disassociated with the communication path. To illustrate, a primary device that may be a cause of unsatisfactory service quality in the communication path may be removed from service and replaced with a backup device. In yet another example, the distribution management device may adjust the communication path by causing a configuration (e.g., a hardware configuration or a software configuration) of one or more network elements in the communication path to be modified. To illustrate, the configuration of a particular network element in the communication path maybe modified to increased or decreased bandwidth allocated to a particular end user device.

In a particular embodiment, a method includes receiving, at a computing device (e.g., the distribution management device), first measurement data from a first device. The first device is a first element of a communication path. The first measurement data corresponds to a first measured parameter associated with performance of the communication path. The method further includes receiving, at the computing device, second measurement data from a second device. The second device is a second element of the communication path. The second measurement data corresponds to a second measured parameter associated with performance of the communication path. The second measured parameter is distinct from the first measured parameter. The method further includes determining a first service quality index value corresponding to performance of the communication path based on the first measurement data and the second measurement data.

In another particular embodiment, a system includes a processor and a memory accessible to the processor. The memory includes instructions that, when executed by the processor, cause the processor to perform operations including receiving, at a computing device (e.g., the distribution management device), first measurement data from a first device. The first device is a first element of a communication path. The first measurement data corresponds to a first measured parameter associated with performance of the communication path. The operations further include receiving, at the computing device, second measurement data from a second device. The second device is a second element of the communication path. The second measurement data corresponds to a second measured parameter associated with performance of the communication path. The second measured parameter is distinct from the first measured parameter. The operations further include determining a service quality index value corresponding to performance of the communication path based on the first measurement data and the second measurement data.

In another particular embodiment, a computer-readable storage device including instructions that, when executed by a processor, cause the processor to perform operations including receiving, at a computing device (e.g., the distribution management device), first measurement data from a first device. The first device is a first element of a communication path. The first measurement data corresponds to a first measured parameter associated with performance of the communication path. The operations further include receiving, at the computing device, second measurement data from a second device. The second device is a second element of the communication path. The second measurement data corresponds to a second measured parameter associated with performance of the communication path. The second measured parameter is distinct from the first measured parameter. The operations further include determining a service quality index value corresponding to performance of the communication path based on the first measurement data and the second measurement data.

Referring to FIG. 1, a diagram illustrating a first embodiment of a system 100 for managing media distribution based on a service quality index value is shown. The system 100 includes one or more servers (e.g., A-servers 114) associated with a super headend office (SHO) (e.g., an SHO 102), one or more servers (e.g., D-servers 116) associated with one or more video headend offices (VHO) (e.g., a VHO 104 and a VHO 106), one or more network elements (e.g., a network element 110 and a network element 120), one or more edge devices (e.g., an edge device 130, an edge device 150, and an edge device 160), and one or more user devices (e.g., a user device 134, a user device 152, and a user device 162), one or more resource systems (e.g., a resource system 140 and a resource system 190), one or more end user devices (e.g., an end user device 132, an end user device 154, an end user device 164, and an end user device 166), or a combination thereof. The system 100 also includes a computing device 180 that is configured to determine a service quality index (SQI) value associated with one or more communication paths of the system 100.

An end user device (e.g., the end user device 132, the end user device 154, the end user device 164, and the end user device 166) may include a set top box (STB) device, a digital video recorder (DVR) device, a personal computer, a terminal, a server, a tablet computing device, a laptop computer, a mobile device, or a combination thereof. The mobile device may be, but is not limited to, a smart phone, a personal digital assistant, and/or a mobile computer.

A network element (e.g., the network element 110 and the network element 120) may include one or more servers, switches, routers, gateways, or other computing or communication devices that facilitate the distribution of media content between one or more servers of a headend office (e.g., a SHO or a VHO) and an edge device, or a combination thereof. An edge device (e.g., the edge device 130, the edge device 150, and the edge device 160) may include one or more video ready access devices (VRAD), one or more routers, one or more routing switches, one or more digital subscriber line access multiplexers (DSLAM), one or more integrated access devices (IAD), one or more wide area network access devices, one or more other devices that facilitate the distribution of media content, or a combination thereof. A user device (e.g., the user device 134, the user device 152, and the user device 162) may include one or more residential gateway (RG) devices, one or more customer premise equipment (CPE) devices, or both.

The system 100 may include or implement a media distribution system (MDS) to distribute media content to one or more end user devices (e.g., the end user device 132, the end user device 154, the end user device 164, and the end user device 166). The media content may include video content, audio content, communication data, voice-over-internet protocol (VoIP) data, image data, or a combination thereof. The media content may be provided by the system 100 based on a media distribution service such as an internet protocol television (IPTV) service, a cable television service, a satellite television service, another service that provides content, a communication service, or a combination thereof. The system 100 may include a hierarchical distribution network, such as an internet protocol television (IPTV) distribution network, a content distribution network, a media distribution network, a communication network (e.g., a mobile communication network), or a combination thereof. The hierarchical distribution network may include two or more levels of distribution nodes. A distribution node of the system 100 may include one or more servers of the SHO 102, one or more servers of the VHOs 104, 106, the one or more network elements 110, 120, the one or more edge devices 130, 150, 160, the one or more user devices 134, 152, 162, or a combination thereof. The servers or devices that are included in distribution node may vary based on a level of the distribution node within the hierarchical distribution network.

The system 100 may include one or more communications paths to distribute media content to one or more end user devices 132, 154, 164, 166. A communication path corresponds to a path of communication connectivity between a higher level distribution node (e.g., a content source or a distribution node including one or more servers of the SHO 102 or one or more servers of the VHO 104, 106) and a terminating end point. The terminating end point may correspond to a single user device (e.g., one of the user devices 134, 152, 162) or a single end user device (e.g., one of the end user devices 132, 154, 164, 166) that receives the media content. The communication path may include a plurality of elements (e.g., a plurality of devices) that support the distribution of media content to the terminating end point via the communication path. Each of the plurality of elements may be associated with a distribution node of a particular level within the hierarchical distribution network. For example, a first communication path of the system 100 may include the SHO 102, the VHO 106, the network elements 120, the edge device 150, the user device 152, and the end user device 154. A second communication path of the system 100 may include the SHO 102, the VHO 106, the network elements 120, the edge device 160, the user device 162, and the end user device 166. An example of a single communication path is shown in more detail in FIG. 2.

In the embodiment illustrated in FIG. 1, the system 100 is a hierarchical media distribution network (HMDN) that provides support for distribution of media content to one or more end user devices (e.g., the end user devices 132, 154, 164, 166). A first level of distribution nodes of the system 100 may include one or more servers of the SHO 102. The SHO 102 may be configured to receive media content from a media content source (not shown), such as content from a media production or distribution company. The SHO 102 may enable distribution of the media content to the one or more end user devices through one or more levels of distribution nodes of the system 100. The SHO 102 may be communicatively coupled to one or more distribution nodes in a second level of distribution nodes of the system 100. The second level of distribution nodes may include one or more servers of the VHOs 104, 106. The second level of distribution nodes may be communicatively coupled to one or more distribution nodes in a third level of distribution nodes of the system 100. The third level of distribution nodes may include the network elements 110, 120. The third level of distribution nodes may be communicatively coupled to one or more distribution nodes in a fourth level of distribution nodes of the system 100. The fourth level of distribution nodes may include the edge devices 130, 150, 160. The fourth level of distribution nodes may be communicatively coupled to one or more fifth level of distribution nodes. The fifth level of distribution nodes may include the user devices 134, 152, 162. The fifth level of distribution nodes may be communicatively coupled to the end user devices 132, 154, 164, 166. In other embodiments, the system 100 may include more levels of distribution nodes, fewer levels of distributions nodes, or different levels of distribution nodes.

A resource system may be coupled to a distribution node of one or more of the levels of distribution nodes. For example, a resource system 140 may be coupled to one or more of the network elements, such as the network element 120 of the third level of distribution nodes in the system 100. In another example, a resource system 190 may be coupled to one or more servers associated with one or more of the VHOs 104, 106 of the second level of distribution nodes in the system 100. The resource systems 140, 190 may include software or hardware that is operable to change or to repair an aspect of a communication path. For example, the resource systems 140, 190 may be operable to perform resource allocation (e.g., to increase or decrease bandwidth allocated to the communication path), to perform testing (e.g., to identify a problem along the communication path) and to repair (e.g., replace a service device with a backup server device in the communication path), to perform configuration adjustments (e.g., to modify bit loading in the communication path), to perform other actions that affect the SQI value of the communication path, or a combination thereof.

The computing device 180 may be coupled to one or more distribution nodes of the system 100. For example, the computing device 180 may be coupled to a distribution node of the SHO 102. The computing device 180 may be configured to monitor service quality and manage the system 100. Managing the distribution of the media content to one or more end user devices (e.g., the end user device 132, the end user device 154, the end user device 164, and the end user device 166) may include monitoring a level of service quality associated with one or more communication paths of the system 100.

The computing device 180 may include a processor 182 and a memory 184 that is accessible to the processor 182. The memory 184 may include instructions that are executable by the processor 182 to cause the processor 182 to perform one or more operations described herein as being performed by the computing device 180. For example, the instructions may include service quality management instructions 186. The service quality management instructions 186 include instructions to determine an SQI value for one or more communication paths of the system 100. The memory 184 may also store the determined SQI values, data used by the service quality management instructions 186 (e.g., measurement data corresponding to measured parameters received from one or more levels of distribution nodes), or both. The measured parameters may be associated with various layers of an open systems interconnection (OSI) standard model. For example, a first measured parameter may be associated with a first layer of the OSI standard model and a second measured parameter may be associated with a distinct layer of the OSI standard model.

The memory 184 may further include resource allocation information 188. The resource allocation information 188 may include instructions that are executable by the processor 182 to cause the processor 182 to change an aspect (e.g., adjust a configuration) of a communication path in a manner that may affect service quality of the communication path. For example, the instructions may be configured to cause the processor 182 to request that the resource system 140, the resource system 190, or both, allocate one or more resources to the communication path.

The computing device 180 may determine an SQI value for one or more communication paths that provide media content to one or more end user devices (e.g., the end user device 132, the end user device 154, the end user device 164, the end user device 166). In a particular embodiment, each SQI value corresponds to a value within a range of values (e.g., a range of numeric values 0 to 100 or a range of alphanumeric values A to Z) of the service quality index (SQI). The SQI may be defined such that a greater level of service quality for a communication path corresponds to a larger value of the index, and, conversely, a lesser level of service quality for a communication path corresponds to a smaller value of the index. Alternatively, the SQI may be defined such that a greater level of service quality for a communication path corresponds to a smaller value of the index, and a lesser level of service quality for a communication path corresponds to a larger value of the index The SQI value for a communication path may be determined based on an aggregation of the measured parameters values. For example, the aggregation may be performed using a scaled value for each measured parameter. The scaled value for a particular measured parameter may correspond to a measured value for the particular measured parameter scaled to a value within a scaling range associated with the SQI. In a particular embodiment, a different scale may be used to determine a scaled value for each different type of measured parameter. The scale may be weighted or selected (e.g., predefined) to account for strength of the measured parameter as an indicator of service quality. For example, when the SQI is arranged such that a larger value indicates higher quality of service, a first measured parameter that is a weak indicator of service quality may have a relatively small predefined range that is used to determine a scaled value associated with the first measured parameter, and a second measured parameter that is a strong indicator of service quality may have a relatively large predefined range that is used to determine a scaled value associated with the first measured parameter. In this example, scaled values associated with the first measured parameter and the second measure parameter may be summed (or otherwise numerically aggregated) to determine an SQI value that accounts for both the first measured parameter and the second measured parameter. Alternatively, or in addition, ranges associated with different measured parameters may be the same size, and a weight value may be applied to each scaled value to account for how strong an indicator of service quality each measured parameters is. For example, each measured parameter (or a set of measured parameters) may be scaled to a value between 1 and 10. In this example, a weighted sum of the scaled values may be used to determine the SQI value, where each scaled value is weighted based on how closely related to service quality a measured parameter associated with the scaled value is.

The computing device 180 may execute instructions in the resource allocation information 188 to perform one or more actions based on the SQI value of the communication path. For example, the one or more actions may include performing one or more adjustments to a communication path based on the SQI value of the communication path. The one or more adjustments may include allocating one or more resources, adjusting one or more elements in the communication path, allocating one or more resources (e.g., testing resources) to perform one or more automated tests, other actions, or a combination thereof. A determination whether to perform an adjustment may be based on the SQI value for the communication path. For example, the computing device 180 may perform the adjustment when the SQI value for the communication path does not satisfy an SQI value threshold. The SQI value threshold may correspond to a threshold level of service quality (e.g., a satisfactory service level). The SQI value threshold may be defined based on historical service quality data, testing, or other information. A change in the level of service quality for the communication path may be reflected by a change in the SQI value.

In a particular embodiment, the computing device 180 may determine whether to perform the adjustment to a communication path based on a comparison of two or more SQI values. For example, the computing device 180 may compare a first SQI value of the communication path and a second SQI value of a second communication path that is distinct from the communication path to determine whether service quality of each communication path is satisfactory. To illustrate, when a difference between a first SQI value of the first communication path (e.g., a reference communication path having service quality that is satisfactory) and the second SQI value of the scond communication path (e.g., a communication path being tested) exceeds a particular amount, the service quality of service for the second communication path may not be satisfactory for a particular end user. An adjustment may be performed for the communication path to change the service quality of the communication path when the service quality of the communication path is unsatisfactory. The SQI value may provide a uniform measure of service quality that enables a plurality of communication paths to be compared based on the SQI value to determine whether service quality to an end user of a particular communication path is satisfactory.

The computing device 180 may perform an adjustment to a communication path by allocating one or more resources to the communication path. For example, the computing device 180 may allocate a resource by sending one or more communication messages to a testing resource (e.g., a test system), to one or more devices (e.g., a server, a storage device, a network element, an edge device, a user device) associated with one or more elements of the communication path, to one or more computing devices (associated with a service center of the MDS), to one or more resource systems (e.g., the resource system 140 and the resource system 190), or to a combination thereof. The computing device 180 may also, or in the alternative, perform an adjustment to the communication path by causing a configuration change (e.g., a hardware configuration change or a software configuration change) to one or more elements in the communication path.

In operation, media content may be distributed to one or more end user devices 132, 154, 164, 166 via the system 100. For example, the A servers 114 of the SHO 102 may send the media content to each of the end user devices 132, 154, 164, 166 via a distinct communication path. For example, the SHO 102 may send the media content to a first end user device 154 via a first communication path. The first communication path may include the first end user device 154, the user device 152, the edge device 150, the network elements 120, the VHO 106, and the SHO 102. In another example, the SHO 102 may send the media content to a second end user device 164 via a second communication path. The second communication path may include the second end user device 164, the user device 162, the edge device 160, the network elements 120, the VHO 106, and the SHO 102. Thus, the first communication path and the second communication path may have some elements in common (such as the network elements 120, the VHO 106, and the SHO 102), and may have some elements that are not in common (such as the second end user device 164, the user device 162, the edge device 160, the first end user device 154, the user device 152, and the edge device 150). A different communication path may correspond to each of the end user devices 132, 154, 164, and 166.

The computing device 180 may determine an SQI value for one or more of the communication paths. The SQI value for a particular communication path may be determined based on measurement data received at the computing device 180 from elements associated with each communication path. For example, one or more of the end user devices 132, 154, 164, 166, one or more of the user devices 134, 152, 162, one or more of the edge devices 130, 150, 160, one or more of the network elements 110, 120, one or more servers of each of the VHOs 104, 106, and one or more servers of the SHO 102 may report measurement data associated with one or more of the communication paths to the computing device 180. The computing device 180 may use the reported measurement data to calculate SQI values for the respective communication paths. The measurement data may correspond to one or more measured parameters of at least a portion of the communication path from which the measured parameter is obtained (e.g., an element of the communication path).

The computing device 180 may change a level of service quality of a communication path by performing an adjustment to the communication path. An adjustment that causes a change in the level of service quality may be reflected by a change in the SQI value. Adjustments to the communication path may be performed based on a comparison of the SQI value to an SQI value threshold. Alternatively, or in addition, adjustments to the communication path may be performed based on a comparison of the SQI value to another SQI value corresponding to another distinct communication path.

In an illustrative example, adjustments may be performed to the first communication path (including the first end user device 154, the user device 152, the edge device 150, the network elements 120, the VHO 106, and the SHO 102) based on a first SQI value. The first SQI value may be determined based on measurement data received from the plurality of elements in the first communication path. For example, the computing device 180 may receive first measurement data from the first end user device 154. The first measurement data may correspond to a first measured parameter (e.g., packet loss) associated with performance of the first communication path. The computing device 180 may also receive second measurement data from a second device in the first communication path (e.g., the network elements 120). The second device is distinct from the first device. The second measurement data may correspond to a second measured parameter (e.g., error seconds associated with digital subscriber line statistics) associated with performance of the first communication path. The second measured parameter may be distinct from the first measured parameter. The second measured parameter may correspond to a measure of performance at the second device. Additionally, or in the alternative, the first and second measured parameters may relate to different layers of an OSI standard model. To illustrate, the first measured parameter may be associated with a first layer of the OSI standard model and the second measured parameter may be associated with a second layer of the OSI standard model, where first layer and the second layer are distinct. Alternatively, the second measured parameter may provide a measurement based on performance of the first communication path and the second communication path (including the second end user device 164, the user device 162, the edge device 160, the network elements 120, the VHO 106, and the SHO 102). The second communication path may be distinct from the first communication path and may provide the media content to the second end user device 164.

In this example, the computing device 180 may determine the first SQI value corresponding to performance of the first communication path based on the first measurement data and the second measurement data. The first SQI value may be determined by converting each measured parameter value to a scaled value for each measured parameter. That is, the computing device 180 may convert each of the measured parameters to a scaled value that is within a range defined by the SQI by using a particular scale for each distinct measurement type of the measured parameters. For example, a first measured parameter value may be converted to a first scaled value (based on a scaling associated with the first measured parameter), and a second measured parameter value may be converted to a second scaled value (based on a scaling associated with the second measured parameter). The first SQI value of the first communication path may be determined as a sum (or another numeric aggregation) of the scaled values associated with the first communication path. To illustrate, the first scaled value and the second scaled value may be summed to determine the first SQI value. Thus, the first SQI value provides an indication of a first level of service quality provided via the first communication path.

In another example, the computing device 180 may determine the first SQI value by using a weighted aggregation of the measured parameters associated with the first communication path. In this example, each measured parameter may be associated with a weight value. The weight value associated with a particular measured parameter may be related to range of values expected to be associated with the particular measured parameter and a relationship of the particular measured parameter to service quality.

The computing device 180 determines whether to perform an adjustment to the first communication path based at least partially on the first SQI value. In a first example, the computing device 180 performs an adjustment to the first communication path when the first SQI value does not satisfy an SQI value threshold for the first communication path. The SQI value threshold defines a particular level of service quality for distribution of the media content to the first device. In a second example, the computing device 180 performs an adjustment to the first communication path based on a comparison of the first SQI value to another SQI value (e.g., the second SQI value). The second SQI value corresponds to the second communication path that provides media content to the end user device 166). The computing device 180 may perform an adjustment to the first communication path when a difference between the first SQI value and the second SQI value does not satisfy (e.g., exceeds) a comparison SQI value threshold. The comparison SQI value threshold may be defined as a maximum acceptable difference of SQI values between two communication paths. Alternatively, the computing device 180 may adjust the first communication path when the first SQI value differs from the second SQI value by a particular amount.

The first communication path may be adjusted by sending one or more communication messages to another element of the system 100 (such as one or more of the resource systems 140, 190). For example, the computing device 180 may direct one or more of the resource systems 140, 190 to perform one or more tests (e.g., automated tests) of the first communication path. In another example, the computing device 180 may send a message to cause one or more computing resources (e.g., a server, a router, a network switch, an edge device, a user device) to be associated with or disassociated with the first communication path. In another example, the computing device 180 may send a message that includes one or more service tickets requesting a service technician to adjust the first communication path.

The computing device 180 may also, or in the alternative, adjust the first communication path by sending a communication message to one or more elements of the first communication path to change a performance configuration (e.g., a hardware configuration or a software configuration). For example, the computing device 180 may send a communication message to one or more servers of the VHO 106, the network element 120, the edge device 150, or the user device 152 to change a performance configuration associated with service provided by the first communication path. Changing the performance configuration of an element may include adjusting a threshold for one or more performance parameters measured at the element. A hardware configuration of an element may be changed by switching one or more hardware resources of the element, adding one or more additional hardware resources, or both. Adjusting the one or more elements of the first communication path may cause a change (typically an improvement) in service quality of the first communication path. Measured parameters received from the one or more elements may change after an adjustment to the one or more elements.

Adjusting the first communication path may cause the level of service quality for the first communication to change. The change in the level of service quality may be reflected by a change in the first SQI value. The computing device 180 may manage the distribution of the media content by monitoring the first SQI value to determine whether to perform one or more additional adjustments.

Thus, the system 100 enables a reduction of resources utilized by a media distribution system to determine service quality for a communication path by including or implementing a computing device that determines an SQI value for the entire communication path. The SQI value provides a uniform measure of a level of service quality that can be used to identify communication paths having one or more common elements that are affected by a similar service quality issue. Defining a weight for each distinct measured parameter used to calculate the SQI value may improve detection of service quality issues that may be difficult to detect based on individual measured parameters.

Figure 2:
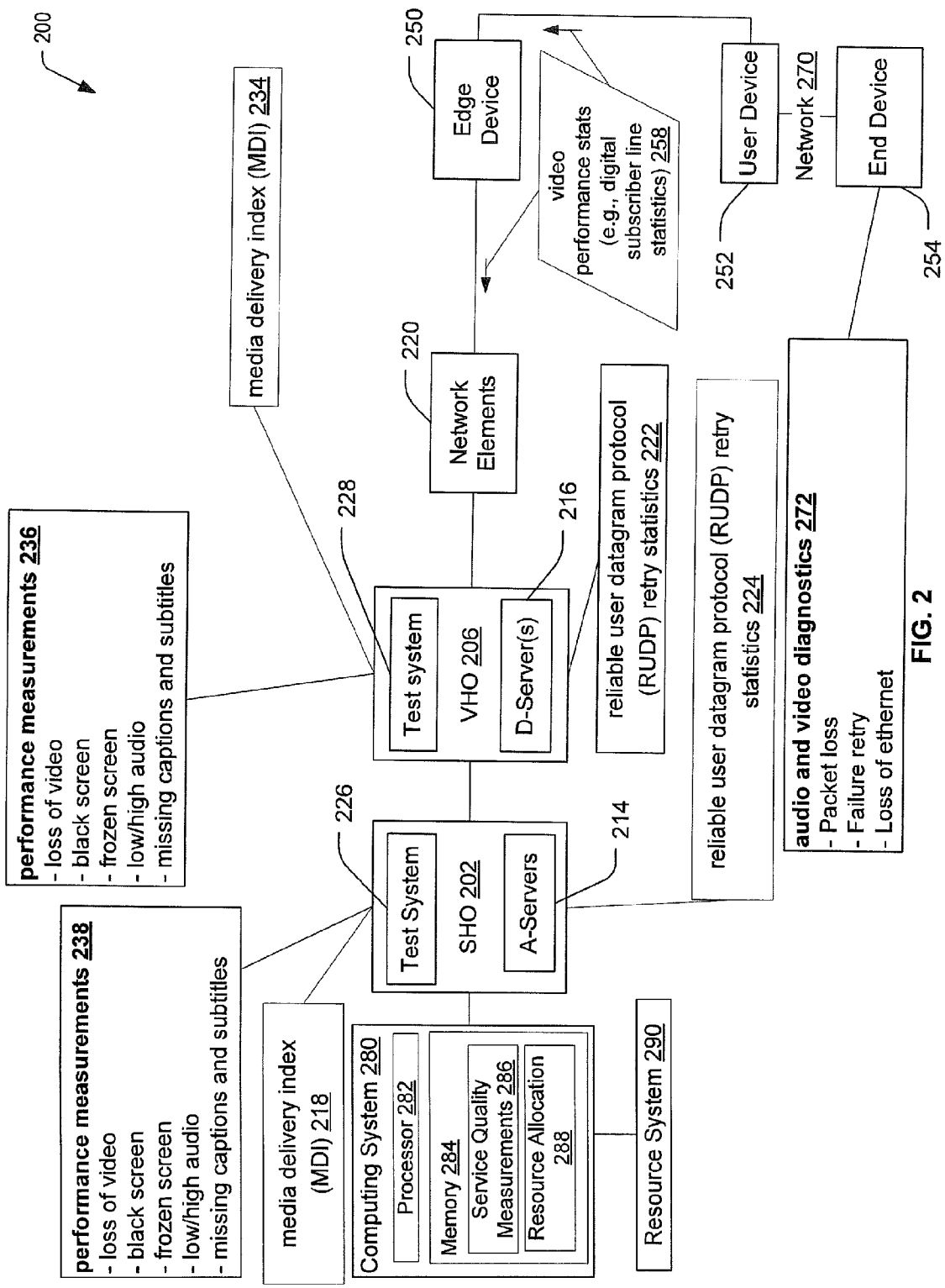
FIG. 2 is a diagram illustrating a second embodiment of a system for managing media distribution based on a service quality index value.

Referring to FIG. 2, a diagram illustrating a second embodiment of a system 200 for managing media distribution based on a service quality index value is illustrated. The system 200 includes certain elements of the system 100 described with respect to FIG. 1. In particular, the system 200 illustrates the first communication path of FIG. 1 (including the SHO 102, the VHO 106, the network elements 120, the edge device 150, the user device 152, and the end user device 154) in more detail. The system 200 also includes the computing device 180 and the resource system 190 of FIG. 1.

The system 200 also includes an additional resource system 270 that may be coupled to the computing device 180. The resource system 270 may include one or more computing devices (e.g., a server) that perform resource allocation for the system 200. The resource system 270 may perform one or more functions described herein as being performed by the resource system 140, the resource system 190, or both. For example, the resource system 270 may associate one or more computing devices (e.g., a router, a network switch, and a server) with the first communication path to adjust a level of service quality associated with performance of the first communication path. In a second example, the resource system 270 may initiate a service request (e.g., a service request ticket) to perform resource allocation for the system 200, such as dispatching a service technician to associate one or more additional computing devices with the first communication path, to disassociate one or more computing devices from the first communication path, or both. In a third example, the resource system 270 may send one or more communication messages to other elements of the system 200 (such as the SHO 102, the VHO 106, the network elements 120, the edge device 150, the user device 152, or the end user device 154) to perform one or more services. The one or more services may include testing at least a portion of the first communication path, adjusting a configuration of an element of the first communication path, or a combination thereof.

In a particular embodiment, one or more elements of the first communication path may include a test system that is operable to perform automated testing of at least a portion of the first communication path. For example, the SHO 102 may include a test system 226 and the VHO 106 may include a test system 228. Each of the test systems 226, 228 may be configured to test (e.g., measure) performance of the distribution of the media content via the first communication path. The testing may include measuring one or more performance parameters associated with the distribution of the media content to the end user device 154 via the first communication path. For example, the test system 226 and the test system 228 may determine one or more reliable user datagram protocol (RUDP) retry statistics 224, 222, respectively. The one or more RUDP retry statistics 222, 224 may provide a measure of a number of retry attempts to send RUDP packets via the first communication path. In another example, the test system 226 and the test system 228 may determine one or more performance parameters 218, 234, respectively, that provide an indication (e.g., a measurement) of quality of the distribution of the media content distributed via the particular communication path. Examples of one or more performance parameters 218, 234 may include (but are not limited to) the following:

- media delivery index associated with a media loss rate (MDI-MLR);
- media loss seconds based on a loss of packets (MLS-LP);
- media loss seconds based on a loss distance errors (MLS-LD);
- media loss total during a fifteen minute inspection period (MLT-15);
- media loss total during a previous twenty-four hour inspection period (MLT-15);
- media loss seconds based on a loss of packets during a fifteen minute inspection period (MLS-15);
- media loss seconds based on a loss of packets during a previous twenty-four hour inspection period (MLS-24);
- real-time transport protocol loss period corresponding to a loss of packets (RTP-LP);
- real-time transport protocol total sequence errors during a maximum time period of fifteen minutes (RTP-SE15);
- real-time transport protocol loss of seconds during a maximum time period of fifteen minutes (RTP-LS15);
- real-time transport protocol count of duplicate sequence numbers as errors (RTP-DUP);
- real-time transport protocol minimum value of a loss distance (RTP-LD);
- real-time transport protocol total sequence errors during a maximum time period of twenty-four hours (RTP-SE24);
- real-time transport protocol total loss of seconds during a maximum time period of twenty four hours (RTP-LS24);
- media delivery index delay factor (MDI-DF);
- internet protocol stream bit rate (IP-SBR);
- video stream outage threshold (VIDEO-LOS);
- traffic jitter;
- packet loss rate;
- packet delay; and
- deviation from a nominal flow rate.

In a particular embodiment, the test system 226 and the test system 228 may detect one or more media content errors 238, 236, respectively, associated with the distribution of the media content to the end user device 154 via the first communication path. The one or more media content errors 236, 238 may include artifacts, such as video loss, static screen, black screen, closed captioning problems (e.g., missing captions and missing subtitles), audio errors (e.g., low audio and high audio), or a combination thereof. The one or more media content errors 236, 238 detected in the media content may be associated with a timestamp and may be stored at an element of the particular communication path for correlation with an SQI value of the first communication path.

The user device 152 (e.g., a residential gateway device) may determine one or more media content performance statistics 258. The one or more media content performance statistics 258 may include performance statistics associated distribution of the media content via one or more digital subscriber lines to the user device 152. The one or more media content performance statistics 258 may include or may be based on one or more parameters measured at the user device 152 associated with the distribution of the media content to the end user device 154. The one or more measured parameters may include one or more digital subscriber line statistics such as error seconds (ES), severe error seconds (SES), unavailable second (UAS), and loss of signal (LOS).

The end user device 154 (e.g., a set top box) may determine audio and video diagnostics 272. The audio and video diagnostics 272 may provide an indication of performance associated with distribution of the media content at the end user device 154. The audio and video diagnostics 272 may include a measurement of one or more parameters, such as packet loss, failure retry, and loss of Ethernet connectivity.

In operation, the computing device 180 may receive measurement data from one or more elements (e.g., the SHO 102, the VHO 106, the network elements 120, the user device 152, and the end user device 154) in the particular communication path of the system 200. The measurement data may correspond to one or more measured parameters of performance associated with the distribution of the media content to the end user device 154. To illustrate, the computing device 180 may receive first measurement data including the one or more performance parameters 218, 234, the one or more media content errors 236, 238, the one or more RUDP retry statistics 222, 224, or a combination thereof, from the test system 226, the test system 228, or both. The computing device 180 may receive second measurement data including one or more media content performance statistics 258 from the user device 152. The computing device may receive third measurement data including the audio and video diagnostics 272 from the end user device 154.

The first measurement data, the second measurement data, and the third measurement data may be used to determine an SQI value corresponding to performance of the first communication path. The SQI value may provide an indication of a level of service quality associated with the distribution of the media content via the first communication path. The computing device 180 may determine the SQI value based on more than one of the first measurement data, the second measurement data, and the third measurement data.

In response to determining the SQI value, the computing device 180 may allocate resources to the particular communication path to change the level of service quality associated with performance of the particular communication path. For example, the SQI value may be compared to an SQI value threshold, which defines a particular level of service quality for the first communication path. To illustrate, when the SQI is established such that an SQI value of 0 corresponds to a lowest level of service quality and an SQI value of 100 corresponds to a highest level of service quality, the SQI value threshold may be set at a value of 80. In this example, when the first communication path is associated with an SQI value of 70 (i.e., less than the SQI value threshold), the computing device 180 may determine that the SQI value does not satisfy the SQI value threshold and that action should be take to increase the SQI value of the first communication path (e.g., by allocating resources to the first communication path).

The computing device 180 may allocate resources to the particular communication path to improve the level of service quality of the particular communication path. An improvement in the level of service quality may correspond to a change (e.g., an increase) in the SQI value. The SQI value for the particular communication path may be periodically or occasionally determined to monitor the level of service quality. Resources may be allocated periodically or occasionally to further change the level of service quality of the particular communication path based on whether the SQI value threshold is satisfied.

Figure 3:
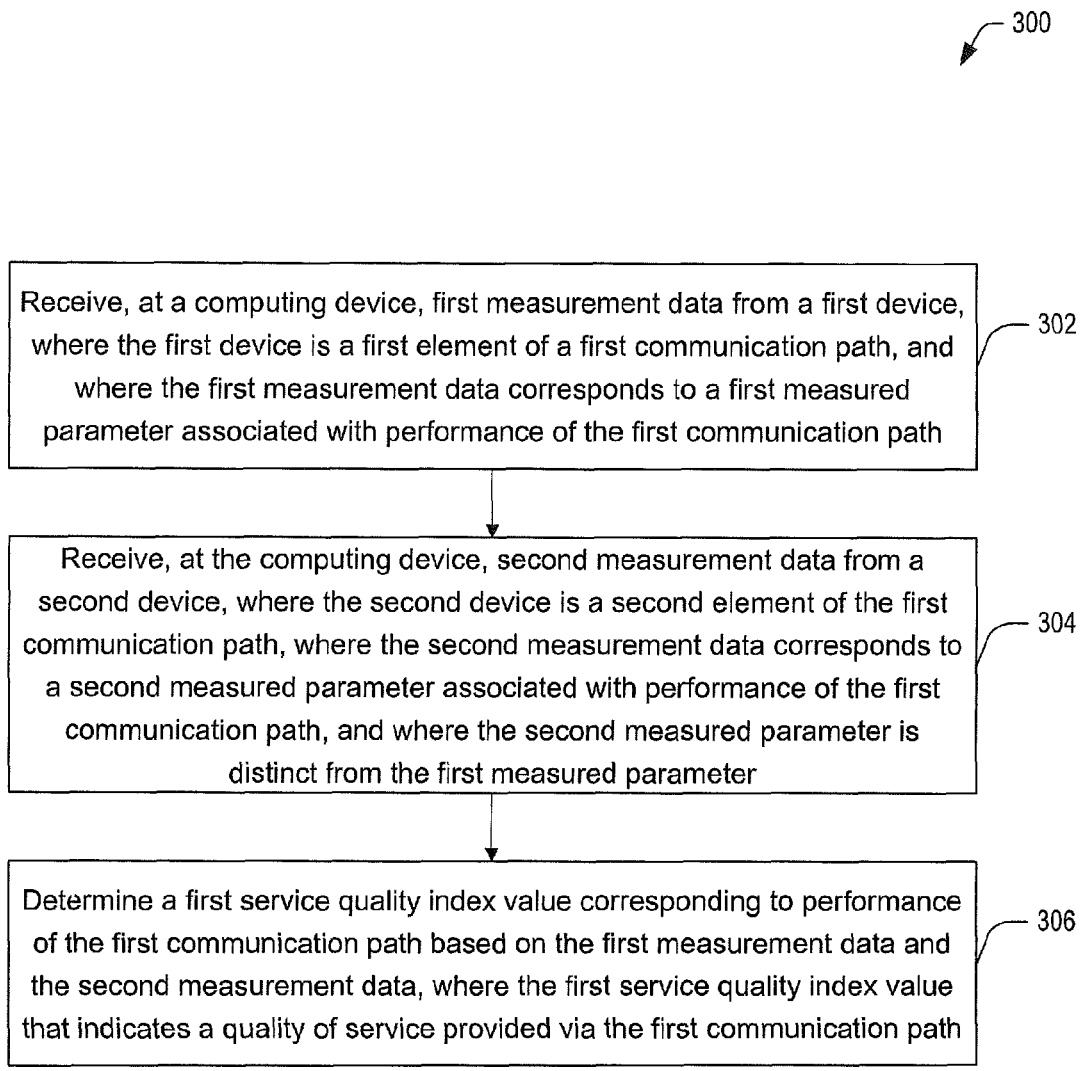
FIG. 3 is a flow chart illustrating a first embodiment of a method for managing media distribution based on a service quality index value.

Referring to FIG. 3, a flow chart illustrating a first embodiment of a method 300 for managing media distribution based on a service quality index value is shown. The method 300 may be performed by the computing device 180 of FIG. 1.

At 302, the method 300 includes receiving, at a computing device, first measurement data from a first device. The first device is a first element of a first communication path. The first measurement data corresponds to a first measured parameter associated with performance of the first communication path. For example, the computing device 180 of FIG. 1 may receive first measurement data from a first device (e.g., the end user device 154) of a first communication path of the system 100. The first communication path may include a plurality of elements, such as the SHO 102, the VHO 106, the network elements 120, the edge device 150, and the user device 152. The first measurement data includes a first measured parameter (e.g., a number of packets lost, a time period of a loss of Ethernet connectivity, etc.) associated with performance of the first communication path.

At 304, the method 300 includes receiving, at the computing device, second measurement data from a second device. The second device is a second element of the first communication path. The second measurement data corresponds to a second measured parameter associated with performance of the first communication path. The second measured parameter is distinct from the first measured parameter of the first measurement data received at the computing device. For example, the computing device 180 of FIG. 1 may receive second measurement data from a second device of the first communication path that is distinct from the first device. The second device may be a different element of the first communication path (e.g., a device of the SHO 102, the VHO 106, the network elements 120, the edge device 150, or the user device 152). The second measurement data corresponds to a second measured parameter (e.g., a digital video subscriber line performance statistic) that is associated with performance of the first communication path and that is distinct from the first measured parameter.

At 306, the method 300 includes determining a first service quality index (SQI) value corresponding to performance of the first communication path based on the first measurement data and the second measurement data. The first SQI value indicates a first level of service quality provided via the first communication path. For example, the computing device 180 of FIG. 1 may determine the first SQI value corresponding to perfoimance of the first communication path based on the first measurement data and the second measurement data. The first SQI value indicates a first level of service quality provided via the first communication path.

Figure 4:
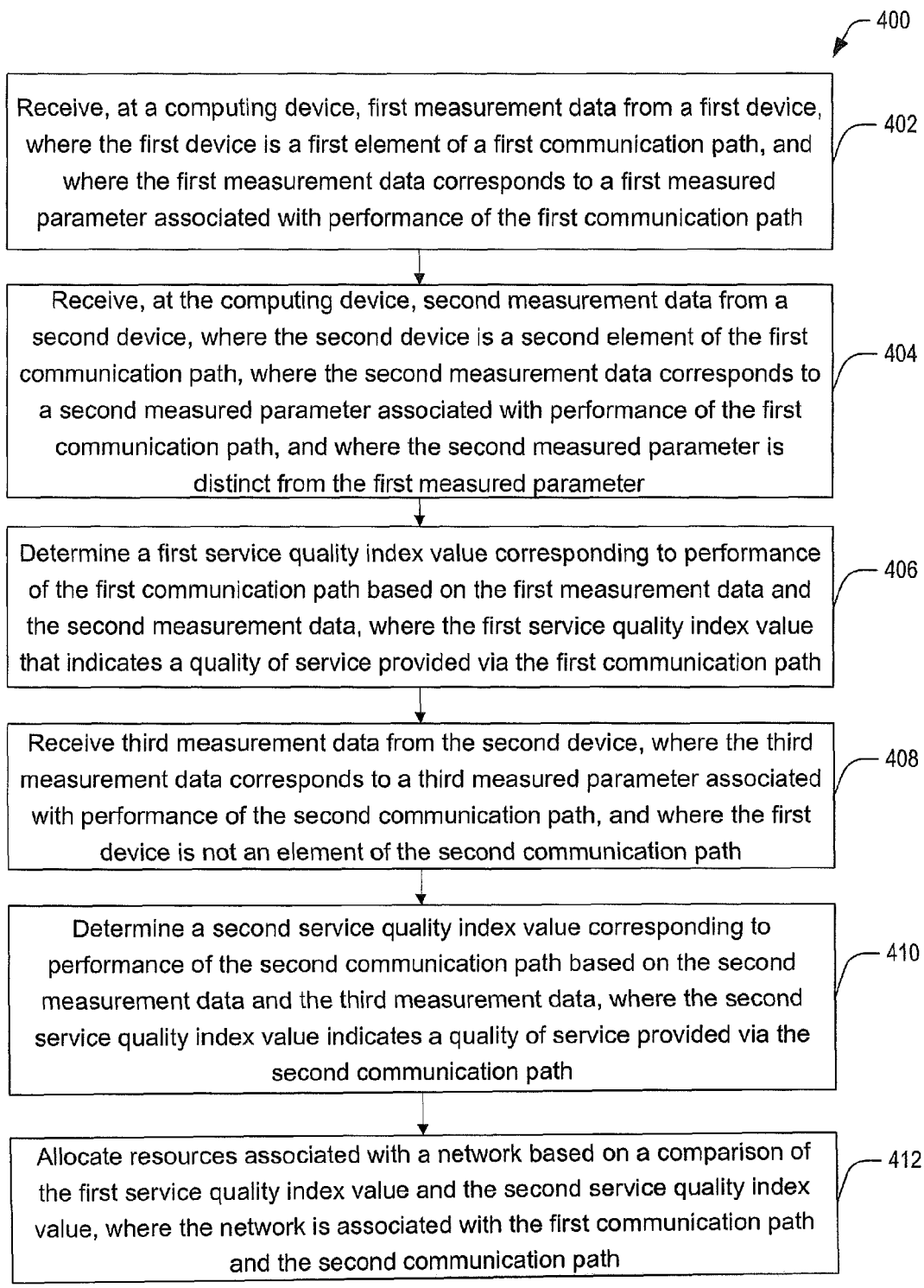
FIG. 4 is a flow chart illustrating a second embodiment of a method for managing media distribution based on a service quality index value.

Referring to FIG. 4, a flow chart illustrating a second embodiment of a method 400 for managing media distribution based on a service quality index value is shown. The method 400 may be performed by the computing device 180 of FIG. 1.

At 402, the method 400 includes receiving, at a computing device, first measurement data from a first device. The first device is a first element of a first communication path. The first measurement data corresponds to a first measured parameter associated with performance of the first communication path. For example, the computing device 180 of FIG. 1 may receive first measurement data from a first device (e.g., the first end user device 154) of a first communication path of the system 100. The first communication path may include a plurality of elements, such as the SHO 102, the VHO 106, the network elements 120, the edge device 150, and the user device 152. The first measurement data includes a first measured parameter (e.g., a number of packets lost, a time period of a loss of Ethernet connectivity, etc.) associated with performance of the first communication path.

At 404, the method 400 includes receiving, at the computing device, second measurement data from a second device. The second device is a second element of the first communication path. The second measurement data corresponds to a second measured parameter associated with performance of the first communication path. The second measured parameter is distinct from the first measured parameter of the first measurement data received at the computing device. For example, the computing device 180 of FIG. 1 may receive second measurement data from a second device of the first communication path that is distinct from the first device. The second device may be a different element of the first communication path (e.g., a device of the SHO 102, the VHO 106, the network elements 120, the edge device 150, or the user device 152). The second measurement data corresponds to a second measured parameter (e.g., a digital video subscriber line performance statistic) that is associated with performance of the first communication path and that is distinct from the first measured parameter.

At 406, the method 400 includes deteimining a first service quality index (SQI) value corresponding to performance of the first communication path based on the first measurement data and the second measurement data. The first SQI value indicates a first level of service quality provided via the first communication path. For example, the computing device 180 of FIG. 1 may determine the first SQI value corresponding to performance of the first communication path based on the first measurement data and the second measurement data. The first SQI value indicates a first level of service quality provided via the first communication path.

At 408, the method 400 includes receiving third measurement data from the second device. The third measurement data corresponds to a third measured parameter associated with performance of a second communication path. The first device is not an element of the second communication path. For example, the computing device 180 of FIG. 1 may receive third measurement data from the user device 162. The third measurement data may correspond to a third measured parameter associated with performance of a second communication path of the system 100. For example, the second communication path may includes a plurality of elements, such as the SHO 102, the VHO 106, the network elements 120, the edge device 160, the user device 162, and the second end user device 164. The first device (e.g., the first end user device 154) is not an element of the second communication path.

At 410, the method 400 includes determining a second SQI value corresponding to performance of the second communication path based on the second measurement data and the third measurement data. The second SQI value indicates a second level of service quality provided via the second communication path. For example, the computing device 180 of FIG. 1 may determine a second SQI value corresponding to performance of the second communication path based on the second measurement data and the third measurement data. The second SQI value indicates a second level of service quality provided via the second communication path.

At 412, the method 400 includes allocating resources associated with a network based on a comparison of the first SQI value and the second SQI value. The network is associated with the first communication path and the second communication path. For example, the computing device 180 of FIG. 1 may allocate resources of the system 100 based on the comparison of the first SQI value to the second SQI value.

Figure 5:
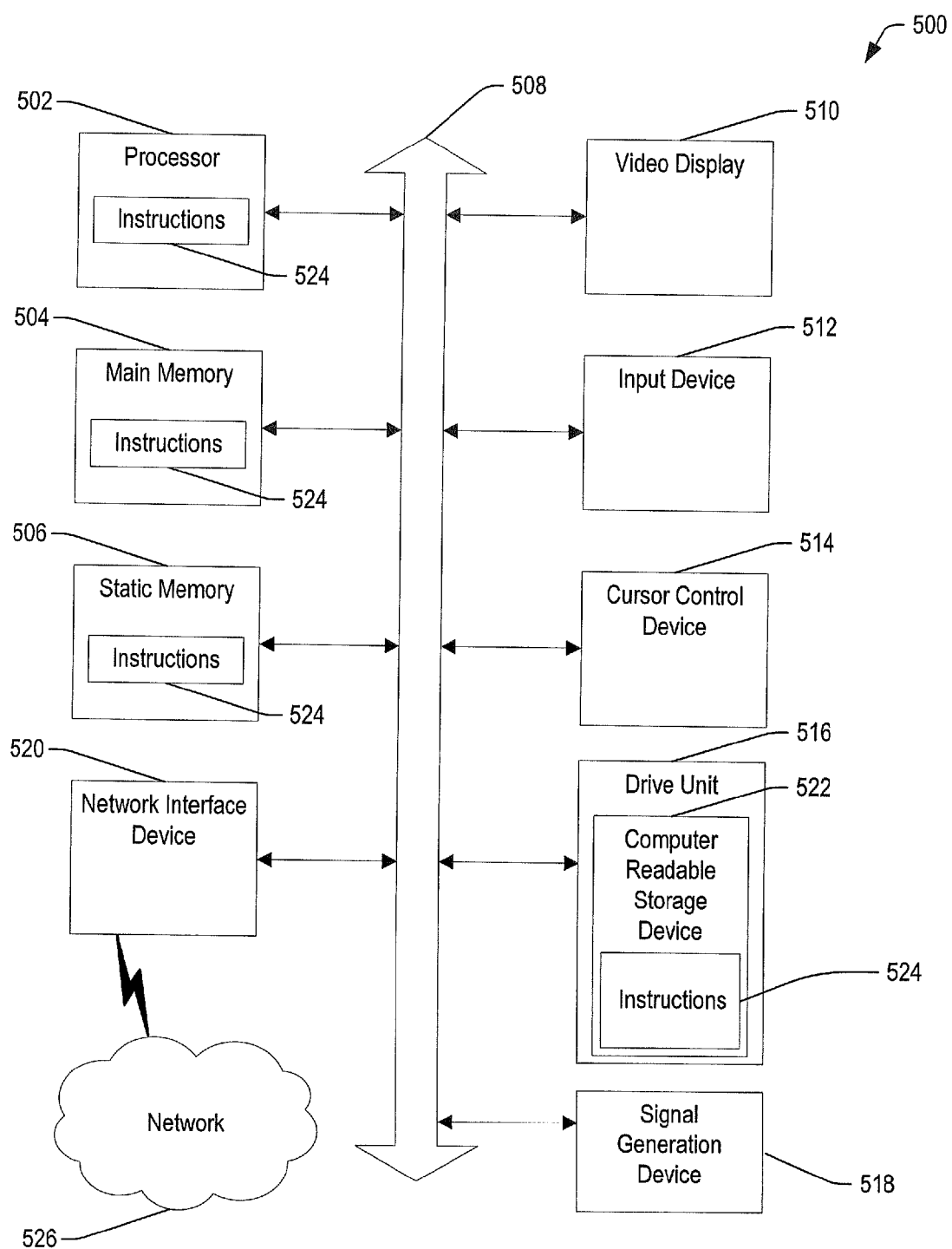
FIG. 5 is an illustration of an illustrative embodiment of a general computer system.

Referring to FIG. 5, an illustrative embodiment of a general computer system is shown and is designated 500. The computer system 500 may include instructions 524 that can be executed to cause the computer system 500 to perform any one or more of the methods or computer based functions disclosed herein. For example, the computer system 500 may include service quality management instructions 550 that are executable to perform functions of the computing device 180 of FIGS. 1 and 2, to perform operations of the methods 300 and 400 of FIGS. 3 and 4, respectively, or a combination thereof. The computer system 500 may operate as a standalone device or may be connected, e.g., using a network, to other computer systems or peripheral devices. For example, the computer system 500 may include, be included within, or correspond to one or more elements of the system 100 or FIG. 1, the computing device 180, one or more elements of the system 200 of FIG. 2, or a combination thereof.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various user devices or network elements, such as a personal computer (PC), a tablet PC, a STB, a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, the processor 502 may correspond to the processor 182 of FIG. 1. Moreover, the computer system 500 may include a main memory 504 and a static memory 506, which can communicate with each other via a bus 508. For example, the main memory 504 may correspond to the memory 184 of FIG. 1.

The computer system 500 may further include a video display unit 510, such as a liquid crystal display (LCD), a flat panel display, a solid state display, or a lamp assembly of a projection system. Additionally, the computer system 500 may include an input device 512, such as a keyboard, and a cursor control device 514, such as a mouse. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a non-transitory computer-readable storage device 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable storage device 522 that stores the instructions 524 or receives, stores, and executes the instructions 524, so that a device connected to a network 526 may communicate voice, video or data over the network 526. For example, the device may include or be included within one or more of the components of the computing device 180 described with reference to FIG. 1. While the tangible computer-readable storage device 522 is shown to be a single device, the tangible computer-readable storage device 522 may include a single medium or multiple media, such as a centralized or distributed database, and/or associated caches and servers that store one or more sets of instructions. The tangible computer-readable storage device 522 may include any tangible medium that is capable of storing a set of instructions for execution by a processor or that cause a computer system to perform any one or more of the methods or operations disclosed herein.

In a particular non-limiting, exemplary embodiment, the tangible computer-readable storage device 522 may include a solid-state memory such as a memory card or other package that houses one or more non-volatile read-only memories.

Further, the tangible computer-readable storage device 522 may be a random access memory or other volatile re-writable memory. Additionally, the tangible computer-readable storage device 522 may include a magneto-optical or optical medium, such as a disk or tapes or other storage device. Accordingly, the disclosure is considered to include any one or more of a tangible computer-readable storage device and other equivalents and successor media, in which data or instructions may be stored.

Although the present specification describes components and functions that may be implemented in particular embodiments with reference to particular standards and protocols, the disclosed embodiments are not limited to such standards and protocols. For example, standards and protocols for communication include real-time transport protocol (RTP), transmission control protocol (TCP)/internet protocol (IP), user datagram protocol (UDP)/internet protocol (IP), or a combination thereof. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a computing device, first measurement data from a first device, wherein the first device is a first element of a communication path, and wherein the first measurement data corresponds to a first measured parameter associated with performance of the communication path;
    receiving, at the computing device, second measurement data from a second device, wherein the second device is a second element of the communication path, wherein the second measurement data corresponds to a second measured parameter associated with performance of the communication path, and wherein the second measured parameter is distinct from the first measured parameter;
    receiving, at the computing device, third measurement data from the second device, wherein the third measurement data corresponds to a third measured parameter associated with performance of a second communication path, and wherein the first device is not an element of the second communication path;
    determining a first service quality index value corresponding to performance of the communication path based on the first measurement data and the second measurement data; and
    determining a second service quality index value corresponding to performance of the second communication path based on the second measurement data and the third measurement data, wherein the first service quality index value is compared to the second service quality index value.

2. The method of claim 1, wherein the communication path corresponds to a distribution path within a hierarchical media distribution network that terminates at an end user device.

3. The method of claim 1, wherein the first device is at a first level of a hierarchical media distribution network and the second device is at a second level of the hierarchical media distribution network, and wherein the first level is distinct from the second level.

4. The method of claim 1, wherein the first measured parameter is associated with a first layer of an open systems interconnection standard model and the second measured parameter is associated with a second layer of the open systems interconnection standard model, and wherein first layer and the second layer are distinct.

5. The method of claim 1, wherein the second device is an element of the second communication path.

6. The method of claim 1, wherein determining the first service quality index value includes weighting the first measurement data based on the first measured parameter and weighting the second measurement data based on the second measured parameter.

7. The method of claim 1, further comprising allocating resources associated with a network based on a comparison of the first service quality index value to the second service quality index value, wherein the network includes the communication path and the second communication path.

8. The method of claim 7, wherein allocating the resources includes allocating a test resource to perform an automated test.

9. The method of claim 7, wherein the resources are allocated to cause a first level of service quality associated with the communication path, a second level of service quality associated with the second communication path, or both, to change, wherein a change in the first level of service quality corresponds to a change in the first service quality index value, and wherein a change in the second level of service quality corresponds to a change in the second service quality index value.

10. The method of claim 7, wherein allocating the resources includes sending a communication message to a device in the communication path requesting the resources to be allocated to the communication path.

11. The method of claim 7, wherein allocating the resources includes associating a third device with the communication path, removing, from the communication path, a fourth device associated with the communication path, or both.

12. The method of claim 7, wherein the resources are allocated when a difference between the first service quality index value and the second service quality index value exceeds a service quality index value threshold.

13. The method of claim 1, further comprising performing an adjustment to the second device based on a comparison of the first service quality index value to the second service quality index value.

14. The method of claim 1, further comprising performing an adjustment to the first device when the first service quality index value differs from the second service quality index value by a particular amount.

15. A system comprising:
   a processor; and
   a memory accessible to the processor, the memory including instructions that, when executed by the processor, cause the processor to perform operations comprising:
      receiving first measurement data from a first device, wherein the first device is a first element of a communication path, and wherein the first measurement data corresponds to a first measured parameter associated with performance of the communication path;
      receiving second measurement data from a second device, wherein the second device is a second element of the communication path, wherein the second measurement data corresponds to a second measured parameter associated with performance of the communication path, and wherein the second measured parameter is distinct from the first measured parameter;
      receiving third measurement data from the second device, wherein the third measurement data corresponds to a third measured parameter associated with performance of a second communication path, and wherein the first device is not an element of the second communication path;
      determining a first service quality index value corresponding to performance of the communication path based on the first measurement data and the second measurement data; and
      determining a second service quality index value corresponding to performance of the second communication path based on the second measurement data and the third measurement data, wherein the first service quality index value is compared to the second service quality index value.

16. The system of claim 15, wherein the first device is an end user device.

17. The system of claim 15, wherein the second device is a router.

18. The system of claim 15, wherein the first measured parameter is associated with a first layer of an open systems interconnection standard model and the second measured parameter is associated with a second layer of the open systems interconnection standard model, and wherein the first layer and the second layer are distinct.

19. A computer-readable storage device including instructions that, when executed by a processor, cause the processor to perform operations comprising:
   receiving first measurement data from a first device, wherein the first device is a first element of a communication path, and wherein the first measurement data corresponds to a first measured parameter associated with performance of the communication path;
   receiving second measurement data from a second device, wherein the second device is a second element of the communication path, wherein the second measurement data corresponds to a second measured parameter associated with performance of the communication path, and wherein the second measured parameter is distinct from the first measured parameter;
   receiving third measurement data from the second device, wherein the third measurement data corresponds to a third measured parameter associated with performance of a second communication path, and wherein the first device is not an element of the second communication path;
   determining a first service quality index value corresponding to performance of the communication path based on the first measurement data and the second measurement data; and
   determining a second service quality index value corresponding to performance of the second communication path based on the second measurement data and the third measurement data, wherein the first service quality index value is compared to the second service quality index value.

20. The computer-readable storage device of claim 19, wherein the operations further comprise allocating resources associated with a network to increase the first service quality index value, wherein the network is associated with the communication path, and wherein the resources are allocated when the first service quality index value does not satisfy a service quality index value threshold based on historical service quality data.

* * * * *